(12) United States Patent
Miyazoe

(10) Patent No.: US 6,854,707 B2
(45) Date of Patent: Feb. 15, 2005

(54) SOLENOID VALVE WITH TERMINAL BOX

(75) Inventor: Shinji Miyazoe, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 34 days.

(21) Appl. No.: 10/614,837

(22) Filed: Jul. 9, 2003

(65) Prior Publication Data

US 2004/0051069 A1 Mar. 18, 2004

(30) Foreign Application Priority Data

Sep. 17, 2002 (JP) ......................................... 2002-270140

(51) Int. Cl.⁷ ............................................. F16K 31/02
(52) U.S. Cl. ................................. 251/129.15; 137/551
(58) Field of Search ..................... 251/129.15; 137/551, 137/625.65

(56) References Cited

U.S. PATENT DOCUMENTS

| | | | | |
|---|---|---|---|---|
| 4,308,891 A | * | 1/1982 | Loup ........................... | 137/551 |
| 4,882,558 A | * | 11/1989 | Takayanagi ............ | 251/129.15 |
| 5,441,233 A | * | 8/1995 | Asou et al. ............ | 251/129.15 |
| 5,584,466 A | | 12/1996 | Fukano et al. | |
| 5,915,666 A | * | 6/1999 | Hayashi et al. ........ | 251/129.01 |
| 6,095,489 A | * | 8/2000 | Kaneko et al. ........ | 251/129.15 |

FOREIGN PATENT DOCUMENTS

JP        2607670        11/2001

* cited by examiner

*Primary Examiner*—John Bastianelli
(74) *Attorney, Agent, or Firm*—Oblon, Spivak, McClelland, Maier & Neustadt, P.C.

(57) ABSTRACT

A solenoid valve includes a first mounting face and a second mounting face for mounting of a terminal box. The first mounting face is formed with terminal holes in which coil terminals are housed and a screw hole for fixing. The second mounting face is provided with an elastic clip having hooks. The terminal box is in a substantially L shape. A first portion of the terminal box is provided with connecting terminals to be connected to the coil terminals, a connector to be brought into continuity with the connecting terminals, and a printed board mounted with an indicating lamp and electric components. A second portion of the terminal box is provided with locking holes into which the hooks of the elastic clip are locked.

9 Claims, 4 Drawing Sheets

SOLENOID VALVE WITH TERMINAL BOX

TECHNICAL FIELD

The present invention relates to a solenoid valve with a terminal box for energizing an exciting coil.

PRIOR ART

In general, a solenoid valve includes a valve main body portion having a valve member for selecting a fluid flow path and a solenoid operating portion having an exciting coil and a movable core and energizes the exciting coil in the solenoid operating portion to thereby operate the movable core and to directly drive the valve member with the movable core or indirectly drive the valve member through another member. For energizing the exciting coil, a receiving connector is provided in a proper position of the solenoid valve and the connector and a coil terminal extending from the exciting coil are connected by various means.

For example, disclosed in Japanese Utility Model Registration No. 2607670 is one in which a terminal box is formed by fixing a cover to an outer face of a solenoid portion of a solenoid valve and mounting a case to the cover, a printed board mounted with electronic components is housed in the terminal box, and a feeding connector is provided to the printed board. A coil terminal extending from an exciting coil passes through the cover to extend into the case and is electrically connected to the printed board, though it is not especially shown in the drawings.

As described above, in the prior-art solenoid valve, in general, the terminal box is assembled by attaching a plurality of members to a valve body in order, the printed board and the like are housed in the terminal box, and the coil terminal and the connector are connected through the printed board. Therefore, a plurality of independent parts must be handled and an assembly operation and the like are relatively complicated.

DISCLOSURE OF THE INVENTION

It is a technical object of the present invention to enable a terminal box having various parts required to energize an exciting coil to be reliably and detachably mounted to a solenoid valve with a simple structure.

To achieve the above object, according to the present invention, there is provided a solenoid valve with a terminal box comprising a solenoid valve for driving a valve member by energization of an exciting coil to select a fluid flow path and a terminal box detachably mounted to the solenoid valve. The solenoid valve includes a first mounting face and a second mounting face to be mounted with the terminal box, adjacent to each other, and orthogonal to each other, the first mounting face is provided with a plurality of terminal holes in which coil terminals in continuity with the exciting coil are housed and a screw hole into which a fixing screw for the terminal box is screwed, the second mounting face is provided with an elastic clip having hooks for locking the terminal box. The terminal box is formed into a substantially L-shaped bent form and includes a first portion for covering the first mounting face of the solenoid valve and a second portion for covering the second mounting face, the first portion is provided with a plurality of connecting terminals to be fitted into the terminal holes to be connected to the coil terminals, a connector having a plurality of receiving terminals to be brought into continuity with the connecting terminals, and a screw insertion hole through which the fixing screw is inserted, and the second portion is provided with locking holes into which the hooks of the elastic clip are locked.

Because the invention has the above structure, the terminal box can be mounted to the solenoid valve by pushing the first portion of the terminal box against the first mounting face of the solenoid valve, inserting the connecting terminals on the first portion into the terminal holes on the first mounting face to connect the connecting terminals to the coil terminals, locking the locking holes formed in the second portion of the terminal box to the elastic clip on the second mounting face of the solenoid valve, and fixing the first portion to the first mounting face with the fixing screw in this state. By only detaching the fixing screw to cancel locking of the elastic clip, the whole terminal box can be easily detached from the solenoid valve. Because the terminal box is formed into the substantially L-shaped bent form, the parts such as the connecting terminals and connectors which are required for electric connection to the solenoid valve are mounted to the first portion, and mechanisms required for locking to the solenoid valve are provided to the second portion, the terminal box can be formed into an extremely simple and rational design structure.

In the invention, it is desirable that the first portion of the terminal box covers the whole of the first mounting face of the solenoid valve and that the second portion covers the whole of the second mounting face.

According to a concrete structural form of the invention, a printed board for bringing the receiving terminals and the connecting terminals into continuity with each other and a gasket for surrounding peripheries of the connecting terminals are housed in the first portion of the terminal box, the printed board is encapsulated in transparent resin together with an indicating lamp and an electronic components mounted on the printed board, the gasket is pressed against peripheries of the terminal holes of the solenoid valve to seal the terminal holes, and an indicating window from which the indicating lamp is observed through the transparent resin is provided in a position of the terminal box corresponding to the indicating lamp.

As described above, because the printed board, the indicating lamp, and the electronic components as a whole are encapsulated into the transparent resin and the peripheries of the terminal holes into which the connecting terminals are fitted are sealed with the gasket, airtightness and electrical insulation of the terminal box and airtightness of the electric connection portion can be improved with an extremely simple structure.

According to another concrete structural form of the invention, a part of the first mounting face of the solenoid valve is formed of a magnetic material cover also functioning as a magnetic frame covering the exciting coil, the connector has a grounding terminal, and the grounding terminal is in contact with the magnetic material cover through the conductive spring.

In the invention, it is preferable that the elastic clip is detachably mounted to the second mounting face of the solenoid valve through the clip holder.

DETAILED DESCRIPTION

Figure 1:
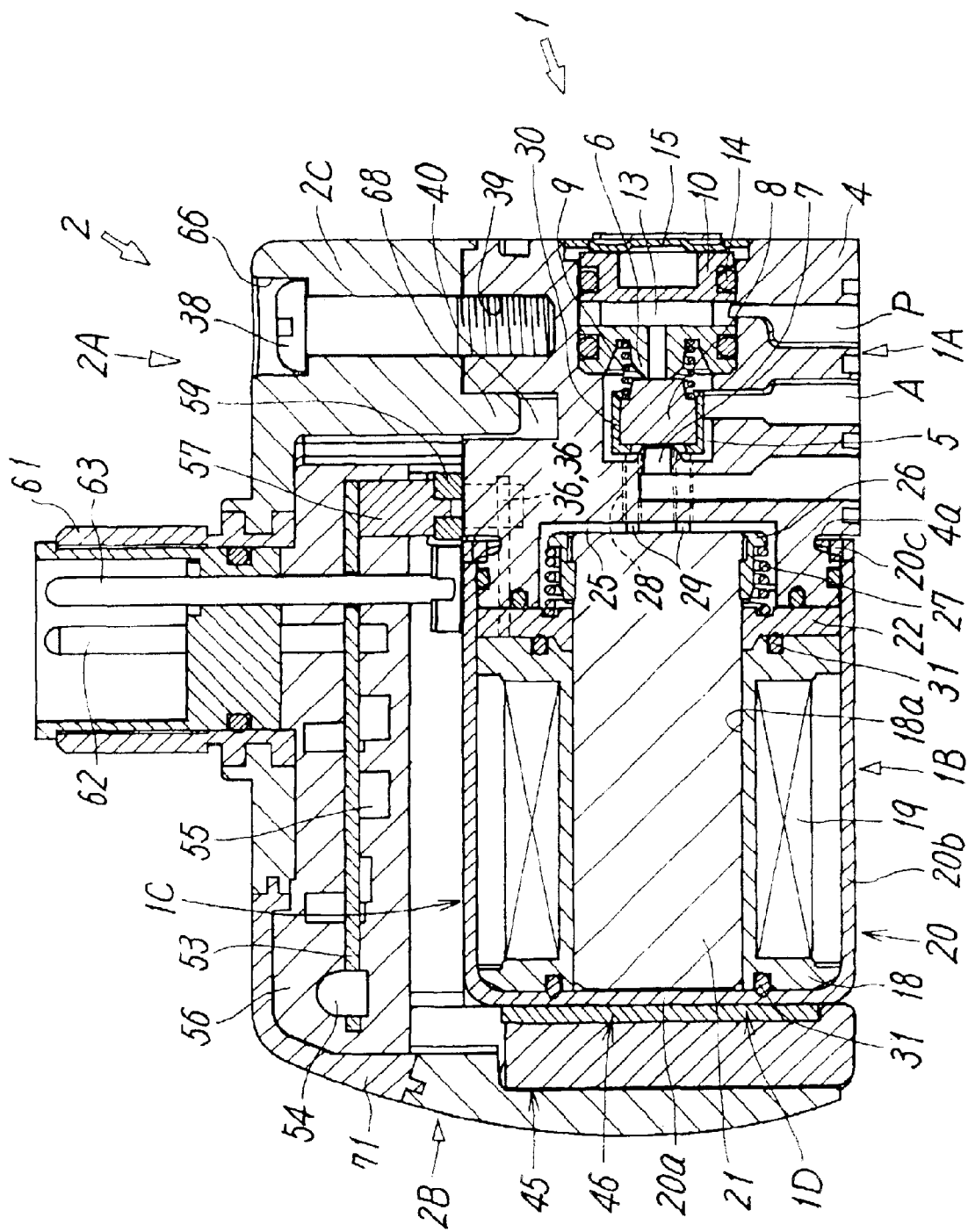
FIG. 1 is a sectional view of an embodiment of a solenoid valve with a terminal box according to the present invention in an assembled state.

FIG. 1 shows a representative embodiment of a solenoid valve with a terminal box according to the present invention. In the drawings, a reference numeral 1 designates a solenoid valve and a reference numeral 2 designates a terminal box 2 detachably mounted to the solenoid valve.

The solenoid valve 1 is a three-port direct-acting solenoid valve and includes a valve main body portion 1A having a valve member 8 for selecting a fluid flow path and a solenoid operating portion 1B for driving the valve member.

The valve main body portion 1A has a housing 4 having a rectangular sectional shape. In a side face of the housing 4, a supply port P, an output port A, and a discharge port R are provided. Provided in the housing 4 are a valve chamber 5 with which the respective ports P, A, and R communicate, a supply valve seat 6 formed in a position with which the supply port P communicates in the valve chamber 5, and a discharge valve seat 7 formed in a position with which the discharge port R communicates. These valve seats 6 and 7 are provided in opposed positions in the valve chamber 5. In the valve chamber 5, the poppet-type valve member 8 for selectively opening and closing the valve seats 6 and 7 is provided and a valve spring 9 for elastically pushing the valve member 8 toward the discharge valve seat 7 is provided between the valve member 8 and a valve seat block 10. The valve seat block 10 is a member in a shape of a cylindrical column and is fitted in a mounting hole formed in an axial end face of the housing 4 to thereby define an end side of the valve chamber 5. The valve seat block 10 is provided with a through hole 13 for allowing the supply port P to communicate with the valve chamber 5 and the supply valve seat 6.

In the drawing, a reference numeral 14 designates a sealing member mounted to an outer periphery of the valve seat block 10 and a reference numeral 15 designates a block retainer for fixing the valve seat block 10 in a mounted state.

The solenoid operating portion 1B includes a bobbin 18 having a core hole 18a at a center and made of non-magnetic material, an exciting coil 19 formed of an electric wire wound around an outer periphery of the bobbin 18, a magnetic material cover 20 in a shape of a prism covering the bobbin 18 and the exciting coil 19, and a movable core 21 housed in the core hole 18a to be movable in an axial direction and made of magnetic material. The core hole 18a and the movable core 21 may have circular sections or oval sections.

The magnetic material cover 20 also functions as a magnetic frame and includes an end plate portion 20a covering an axial end face of the bobbin 18 and a skirt portion 20b surrounding outer peripheries of side faces of the bobbin 18 and the exciting coil 19 and the end plate portion 20a also functions as a fixed core. Inside the magnetic material cover 20, an annular magnetic plate 22 having a core hole is disposed to be in contact with the other end face side of bobbin 18 and is fixed to the magnetic material cover 20 by means of welding or the like. An open end of the skirt portion 20b is fitted over an end portion of the housing 4 of the valve main body portion 1A and a hook 20c provided to the end portion of the skirt portion 20b is elastically locked into a recessed portion 4a in the side face of the housing 4 to thereby connect the solenoid operating portion 1B to the valve main body portion 1A.

In the end face of the housing 4, a core chamber 25 formed of a recessed portion is formed. A tip end of the movable core 21 passes through the magnetic plate 22 and extends into the core chamber 25. A cap 26 made of synthetic resin is mounted to an outer periphery of a tip end portion of the movable core 21 and a core spring 27 for elastically pushing the movable core 21 away from the end plate portion 20a is provided between the cap 26 and the magnetic plate 22.

The housing 4 is formed with a plurality of guide holes 28 connecting the core chamber 25 and the valve chamber 5 and a plurality of push rods 29 having opposite ends extending into the core chamber 25 and the valve chamber 5 are inserted to be movable through the guide holes 28. These push rods 29 are formed integrally with a valve holder 30 for holding the valve member 8 and made of synthetic resin. A tip end of each the push rod 29 extends into the core chamber 25 to be in contact with an end face of the movable core 21. However, each the push rod 29 may be formed independently of the valve holder 30 and the opposite ends of the push rod 29 may be in contact with the movable core 21 and the valve member 8. These push rods 29 are for transferring movement of the movable core 21 to the valve member 8 to switch the valve member 8. When the movable core 21 is in a forward movement position at a distance from the end plate portion 20a as shown in FIG. 1, the valve member 8 is pushed by these push rods 29 to open the discharge valve seat 7 and to close the supply valve seat 6. If the movable core 21 is attracted by the end plate portion 20a and moves rearward, the push rods 29 also move rearward to cancel pressing of the valve member 8. As a result, the valve member 8 moves due to an elastically pushing force of the valve spring 9 to open the supply valve seat 6 and to close the discharge valve seat 7.

In the solenoid valve 1 having the above structure, if the exciting coil 19 is not energized, the movable core 21 is pushed by an elastically pushing force of the core spring 27 to occupy the forward movement position at a distance from the end plate portion 20a as shown in FIG. 1. Therefore, the valve member 8 is pushed by the movable core 21 through the push rods 29 to open the discharge valve seat 7 and to close the supply valve seat 6. Therefore, the supply port P is closed and the output port A and the discharge port R communicate with each other. If the exciting coil 19 is energized, the movable core 21 is attracted by the end plate portion 20a and moves rearward to cancel pressing of the valve member 8 by the push rods 29. As a result, the valve member 8 moves due to the elastically pushing force of the valve spring 9 to open the supply valve seat 6 and to close the discharge valve seat 7. Therefore, the discharge port R is closed and the supply port P and the output port A communicate with each other.

Because the core hole 18a and the core chamber 25 are isolated from outside with a sealing member 31, there is no problem if the core chamber 25 and the valve chamber 5 communicate with each other through the guide holes 28.

The exciting coil 19 is energized through the terminal box 2. A concrete structure of the terminal box 2 and a structure for mounting to the solenoid valve 1 are as described below in detail.

Figure 2:
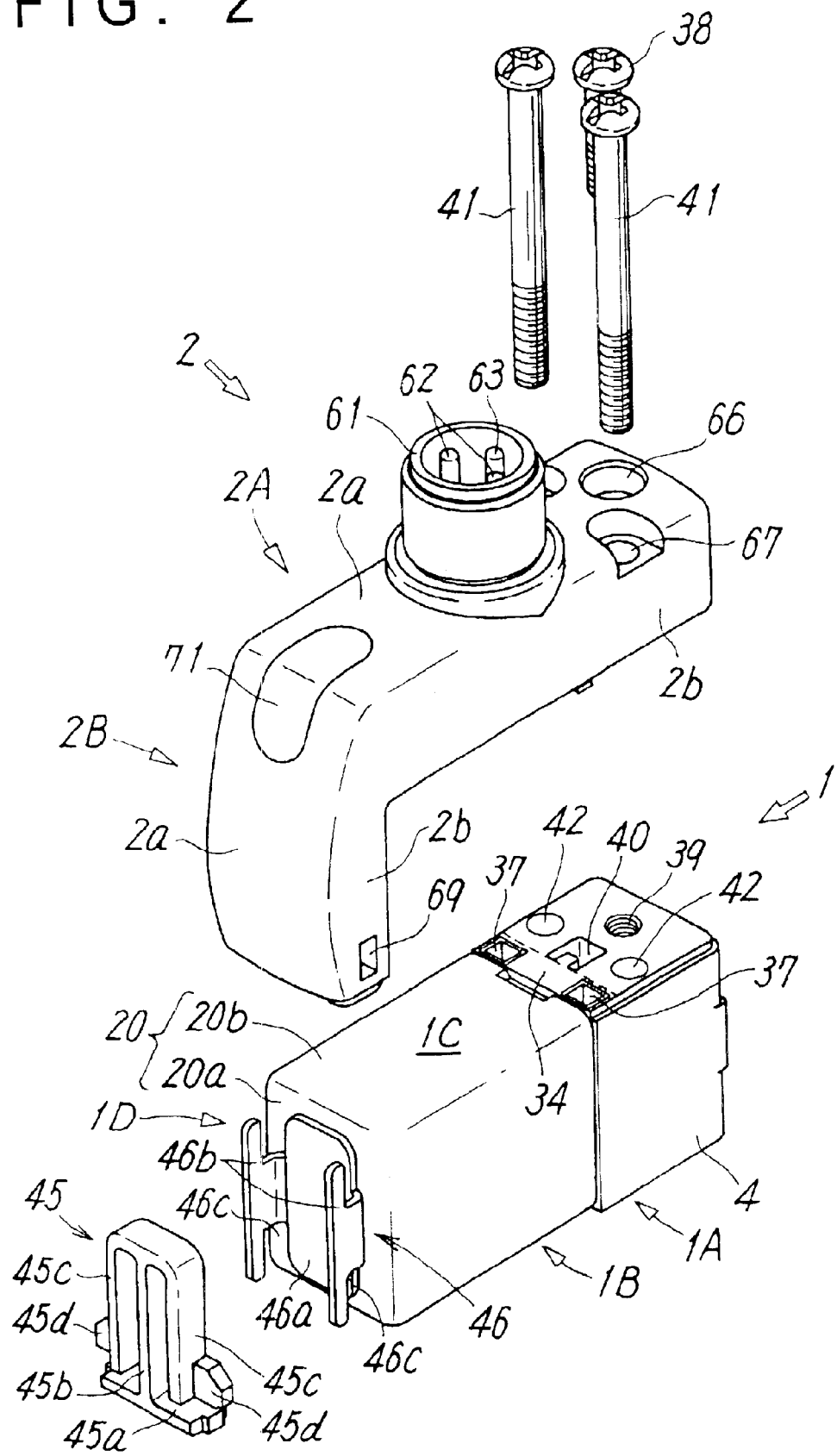
FIG. 2 is an exploded perspective view of the solenoid valve with the terminal box in FIG. 1.

As can be understood from FIG. 2, the solenoid valve 1 has substantially flat first mounting face 1C and second mounting face 1D for mounting the terminal box 2, adjacent to each other, and orthogonal to each other. The first mounting face 1C is formed on a side face of the housing 4 opposite to the face provided with the respective ports and extends astride the whole side face of the housing 4 and the whole side face of the magnetic material cover 20 in the solenoid operating portion 1B. The first mounting face 1C is provided at the side face portion of the housing 4 with two terminal holes 37, 37 in which two coil terminals 36, 36 to be brought into continuity with the exciting coil 19 are housed individually, a screw hole 39 into which a fixing screw 38 for the terminal box is screwed, a positioning hole 40 for positioning the terminal box 2, and two mounting holes 42, 42 through which mounting screws 41 for mounting the solenoid valve with the terminal box to a manifold or the like.

The two terminal holes 37, 37 are formed side by side at an interval in a width direction of the housing 4 in a position of the housing 4 close to the solenoid operating portion 1B. The screw hole 39 is formed at a center in a position of the housing 4 opposite to the solenoid operating portion 1B. The two mounting holes 42, 42 are formed in positions between the terminal holes 37, 37 and the screw hole 39 and the positioning hole 40 is formed between the two mounting holes 42, 42.

The coil terminals 36, 36 pass through the magnetic plate 22 in an electrically insulated state, extends toward the housing 4, and extends to positions of the terminal holes 37, 37 through introducing holes provided to the end face of the housing 4.

The second mounting face 1D is formed on an outer face of the end plate portion 20a of the magnetic material cover 20 and an elastic clip 45 is detachable mounted to the second mounting face 1D through a clip holder 46.

The elastic clip 45 is integrally molded of synthetic resin and includes a base 45a, a support column 45b standing from a central portion of an upper face of the base 45a, left and right two locking arms 45c, 45c having elasticity and diverging into a U shape from an upper end of the support column 45b with tip ends of the arms 45c, 45c then extending close to the base 45a, and hooks 45d, 45d respectively provided to outer side faces of a lower end portion of the locking arms 45c, 45c.

The clip holder 46 is formed of hard material such as metal and includes a base 46a fixed to the second mounting face 1D by welding or the like and two retaining arms 46b, 46b standing perpendicularly from left and right opposite side edges of the base 46a. By inserting the locking arms 45c, 45c of the elastic clip 45 between the two retaining arms 46b, 46b from a lower end side of the clip holder 46 and fitting the hooks 45d, 45d in notches 46c, 46c at end portions of the retaining arms 46b, 46b, the elastic clip 45 is detachably retained by the clip holder 46.

Figure 3:
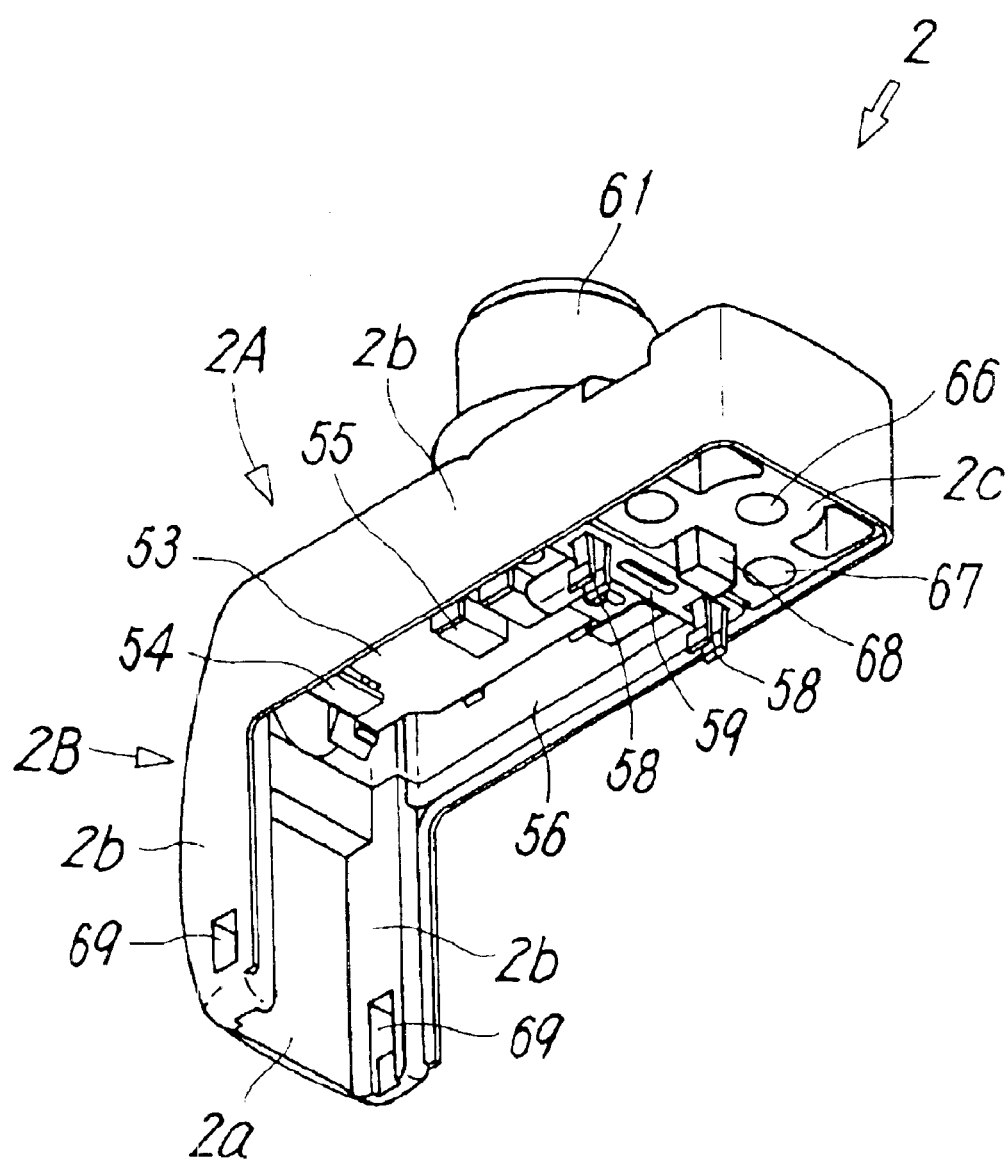
FIG. 3 is a perspective view of the terminal box viewed diagonally from below.
Figure 4:
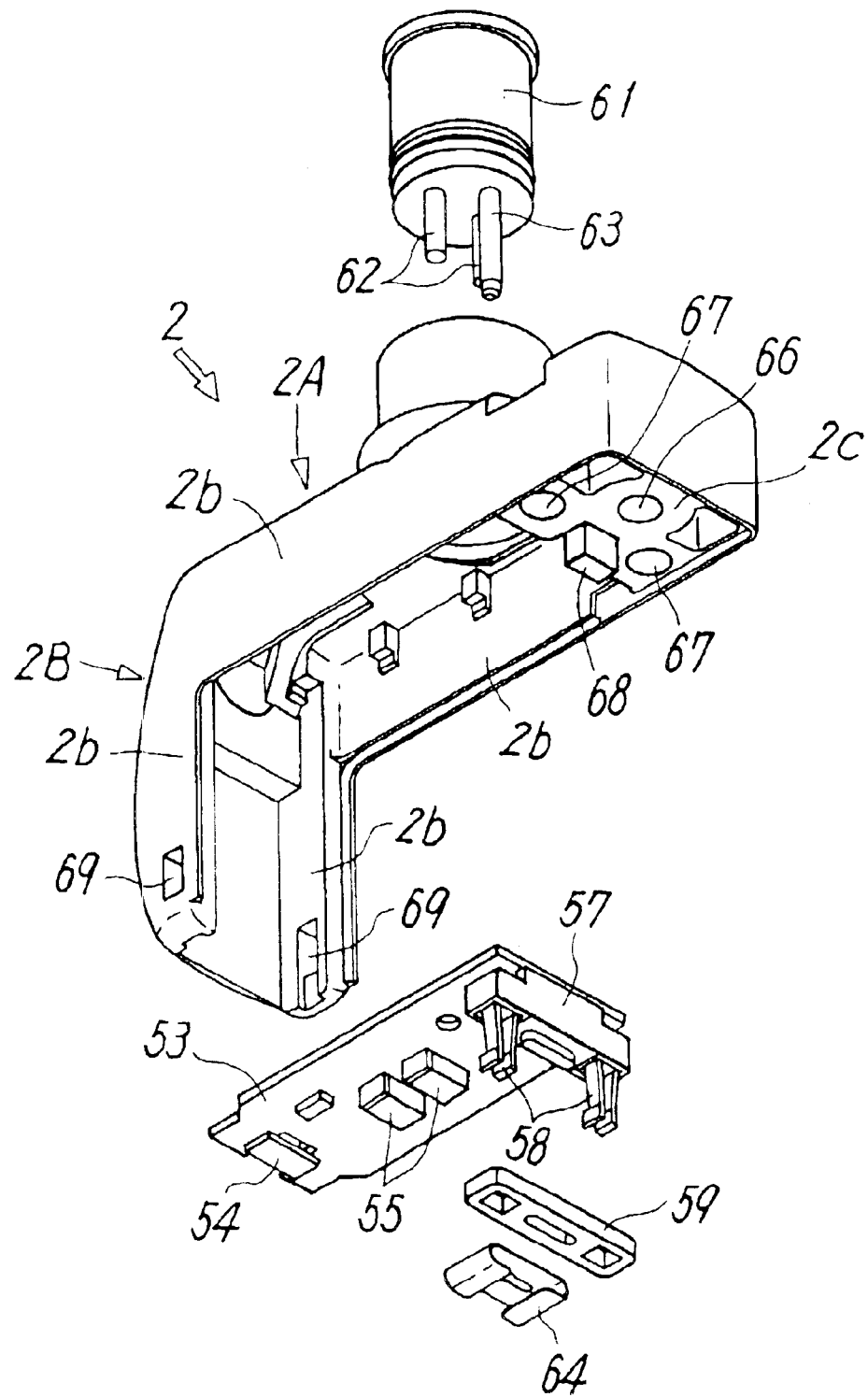
FIG. 4 is an exploded perspective view of the terminal box in FIG. 3.

The terminal box 2 is formed in a substantially L-shaped bent form and includes a first portion 2A for covering substantially the whole of the first mounting face 1C of the solenoid valve 1 and a second portion 2B for covering substantially the whole of the second mounting face 1D. As can be understood from FIGS. 3 and 4, the first portion 2A has a groove-shaped section or the like similar and has an upper wall portion 2a and side wall portions 2b, 2b extending perpendicularly from left and right opposite side edges of the upper wall portion 2a. Inside the first portion 2A, a printed board 53 mounted with an indicating lamp 54 and other necessary electronic components 55 is housed in a state in which the whole printed board 53 is encapsulated in transparent resin 56 together with the indicating lamp 54 and the electronic components 55.

The printed board 53 is mounted with a terminal holder 57 with a part of the terminal holder 57 being embedded in the transparent resin 56. Two connecting terminals 58, 58 are retained by the terminal holder 57 while being electrically connected to the printed board 53 and a gasket 59 surrounding peripheries of the connecting terminals 58, 58 and in a shape of a slim rectangular parallelepiped is provided. The connecting terminals 58, 58 are fitted in the terminal holes 37, 37 in the solenoid valve 1 to be connected to the coil terminals 36, 36. The gasket 59 is pressed against a sealing face 34 around the terminal holes 37, 37 in the solenoid valve 1 to thereby seal peripheries of the terminal holes 37, 37.

On an upper face of the upper wall portion 2a in the first portion 2A of the terminal box 2, a connector 61 having two receiving terminals 62, 62 and a grounding terminal 63 is provided. Base end portions of the receiving terminals 62, 62 are embedded in the transparent resin 56 to be electrically continuous with the printed board 53 to thereby be electrically connected to the connecting terminals 58, 58 through the printed board 53. A base end portion of the grounding terminal 63 passes through the transparent resin 56 and the printed board 53 to extend into the first portion 2A and is mounted with a conductive spring 64 in contact with an outer side face of the magnetic material cover 20.

In a position of the first portion 2A close to a tip end, a thick-walled end wall portion 2c is provided to a portion in contact with the housing 4 and the end wall portion 2c is provided with a screw insertion hole 66 through which the fixing screw 38 is inserted, screw through holes 67 through which the mounting screws 41 are inserted, and a projection 68 to be fitted in the positioning hole 40 for positioning.

On the other hand, the second portion 2B of the terminal box 2 has a groove-shaped section or the like similar to the first portion 2A and has an upper wall portion 2a and side wall portions 2b, 2b standing perpendicularly from left and right opposite side edges of the upper wall portion 2a. End portions of the opposite side wall portions 2b, 2b are provided with locking holes 69, 69 into which the hooks 45d, 45d of the elastic clip 45 are fitted and locked.

In a position of the terminal box 2 corresponding to the indicating lamp 54, a transparent indicating window 71 is provided. From the indicating window 71, the indicating lamp 54 can be observed through the transparent resin 56.

In order to mount the terminal box 2 to the solenoid valve 1, the first portion 2A of the terminal box 2 is placed on and pushed strongly against the first mounting face 1C of the solenoid valve 1 from above. Then, the positioning projection 68 is fitted in the positioning hole 40 of the solenoid valve 1 to thereby position the terminal box 2 and the connecting terminals 58, 58 are fitted in the terminal holes 37, 37 to be connected to the coil terminals 36, 36. Furthermore, into the locking holes 69, 69 in the second portion 2B of the terminal box 2, the hooks 45d, 45d of the elastic clip 45 provided to the second mounting face 1D of the solenoid valve 1 are elastically fitted and locked. Then, by fixing the first portion 2A to the first mounting face 1C by the fixing screw 38, the terminal box 2 is mounted to the solenoid valve 1. At this time, the gasket 59 is pressed against the sealing face 34 around the terminal holes 37, 37 in the solenoid valve 1 to thereby seal the terminal holes 37, 37 and the conductive spring 64 mounted to the base end portion of the grounding terminal 63 comes in contact with the outer side face of the magnetic material cover 20.

In order to detach the terminal box 2 from the solenoid valve 1, by only detaching the fixing screw 38 to cancel locking of the elastic clip 45, the whole terminal box 2 can be easily detached from the solenoid valve 1.

As described above, by forming the terminal box 2 into the substantially L-shaped bent form, mounting parts such as the connecting terminals 58, 58, the connector 61, and the printed board 53 for electrically connecting them which are required to electrically connect to the solenoid valve 1 to the first portion 2A, and mounting mechanisms required for locking to the solenoid valve 1 to the second portion 2B, the terminal box 2 can be formed into an extremely simple and rational design structure and can be detachably mounted to the solenoid valve by a simple operation. Especially, if the straight terminal box is mounted to only one mounting face of the solenoid vale, both the parts required for electric connection to the solenoid valve and mechanism required for locking to the solenoid valve must be provided to the terminal box and therefore, a size of the terminal box tends to increase and it is difficult to apply the terminal box to a small-sized solenoid valve. However, by forming the terminal box 2 and the solenoid valve 1 as described above, such a problem can be easily solved.

By encapsulating the printed board 53, the indicating lamp 54, and the electronic components 55 as a whole into the transparent resin 56 and sealing the peripheries of the terminal holes 37, 37 into which the connecting terminals 58, 58 are fitted with the gasket 59, airtightness and electrical insulation of the terminal box 2 and airtightness of the electric connection portion can be improved with an extremely simple structure.

Although the three-port direct-acting solenoid valve is shown in the above embodiment, a form of the solenoid valve is not limited to this. For example, the solenoid valve may be two-port, four-port, or five-port solenoid valve. An operating method is not limited to the direct acting type and may be a pilot type.

Although the first portion 2A and the second portion 2B of the terminal box 2 are formed to cover the whole of the first mounting face 1C and the second mounting face 1D of the solenoid valve 1, they do not necessarily cover the whole of the respective mounting faces but may cover only parts of the faces.

As described above, according to the invention, because the terminal box is formed into the substantially L-shaped bent form, the parts which are required for electric connection to the solenoid valve are mounted to the first portion, and mechanisms required for locking to the solenoid valve are mounted to the second portion, the terminal box can be formed into an extremely simple and rational design structure and can be detachably mounted to the solenoid valve by a simple operation.

What is claimed is:

1. A solenoid valve with a terminal box comprising a solenoid valve for driving a valve member by energization of an exciting coil to select a fluid flow path and a terminal box detachably mounted to the solenoid valve, wherein the solenoid valve includes a first mounting face and a second mounting face to be mounted with the terminal box, adjacent to each other, and orthogonal to each other, the first mounting face is provided with a plurality of terminal holes in which coil terminals in continuity with the exciting coil are housed and a screw hole into which a fixing screw for the terminal box is screwed, the second mounting face is provided with an elastic clip having hooks for locking the terminal box, the terminal box is formed into a substantially L-shaped bent form and includes a first portion for covering at least a part of the first mounting face of the solenoid valve and a second portion for covering at least a part of the second mounting face, the first portion is provided with a plurality of connecting terminals to be fitted into the terminal holes to be connected to the coil terminals, a connector having a plurality of receiving terminals to be brought into continuity with the connecting terminals, and a screw insertion hole through which the fixing screw is inserted, and the second portion is provided with locking holes into which the hooks of the elastic clip are locked.

2. A solenoid valve with a terminal box according to claim 1, wherein the first portion of the terminal box covers the whole of the first mounting face of the solenoid valve and the second portion covers the whole of the second mounting face.

3. A solenoid valve with a terminal box according to claim 1, wherein a printed board for bringing the receiving terminals and the connecting terminals into continuity with each other and a gasket for surrounding peripheries of the connecting terminals are housed in the first portion of the terminal box, the printed board is encapsulated in transparent resin together with an indicating lamp and an electronic components mounted on the printed board, the gasket is pressed against peripheries of the terminal holes of the solenoid valve to seal the terminal holes, and an indicating window from which the indicating lamp is observed through the transparent resin is provided in a position of the terminal box corresponding to the indicating lamp.

4. A solenoid valve with a terminal box according to claim 1, wherein a part of the first mounting face of the solenoid valve is formed of a magnetic material cover also functioning as a magnetic frame covering the exciting coil, the connector has a grounding terminal, and the grounding terminal is in contact with the magnetic material cover through the conductive spring.

5. A solenoid valve with a terminal box according to claim 1, wherein the elastic clip is detachably mounted to the second mounting face of the solenoid valve through the clip holder.

6. A solenoid valve with a terminal box according to claim 3, wherein a part of the first mounting face of the solenoid valve is formed of a magnetic material cover also functioning as a magnetic frame covering the exciting coil, the connector has a grounding terminal, and the grounding terminal is in contact with the magnetic material cover through the conductive spring.

7. A solenoid valve with a terminal box according to claim 3, wherein the elastic clip is detachably mounted to the second mounting face of the solenoid valve through the clip holder.

8. A solenoid valve with a terminal box according to claim 4, wherein the elastic clip is detachably mounted to the second mounting face of the solenoid valve through the clip holder.

9. A solenoid valve with a terminal box according to claim 5, wherein the elastic clip is detachably mounted to the second mounting face of the solenoid valve through the clip holder.

* * * * *